Figure 3:
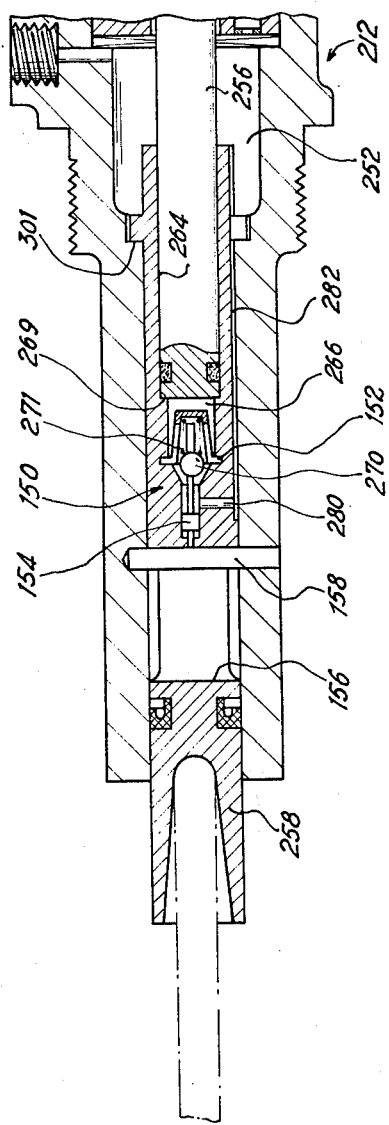

# United States Patent
Thomas et al.

[11] 3,915,066
[45] Oct. 28, 1975

[54] POWER BOOST MECHANISM
[75] Inventors: Alfred William Thomas; John Redvers Botterill, both of Saarbrucken, Germany
[73] Assignee: Deutsche Bendix, Saarbrucken, Germany
[22] Filed: Dec. 3, 1973
[21] Appl. No.: 421,464

[30] Foreign Application Priority Data
Dec. 8, 1972 Germany............................ 2260246

[52] U.S. Cl................... 91/391 R; 91/404; 91/450; 91/460; 92/166
[51] Int. Cl.²..................... F15B 13/10; F15B 17/02
[58] Field of Search ................. 91/391, 460; 60/555

[56] References Cited
UNITED STATES PATENTS
3,831,491  8/1974  Thomas ................................. 91/460
3,838,629  10/1974  Meyers ................................. 91/460

Primary Examiner—Paul E. Maslousky
Attorney, Agent, or Firm—Ken C. Decker; William N. Antonis

[57] ABSTRACT

A power boost mechanism for use in a braking system of an automotive vehicle, and comprising a servomotor and a servovalve. The valve housing is provided with an inlet port, an outlet port and an exhaust port. A spool valve movable in the valve housing, includes a central bore and passages to selectively communicate the inlet port and the exhaust port with a work port connected to the working chamber of the servomotor. An output piston is located in said working chamber and comprises an output plunger projecting into an enclosed chamber filled with incompressible fluid. In the control chamber also projects an operator-actuated input member in which projects said output plunger to define therewith a cavity. The cavity communicates with said control chamber through a one-way valve and by an exhaust passage closed when said input plunger is biased toward said output plunger.

4 Claims, 3 Drawing Figures

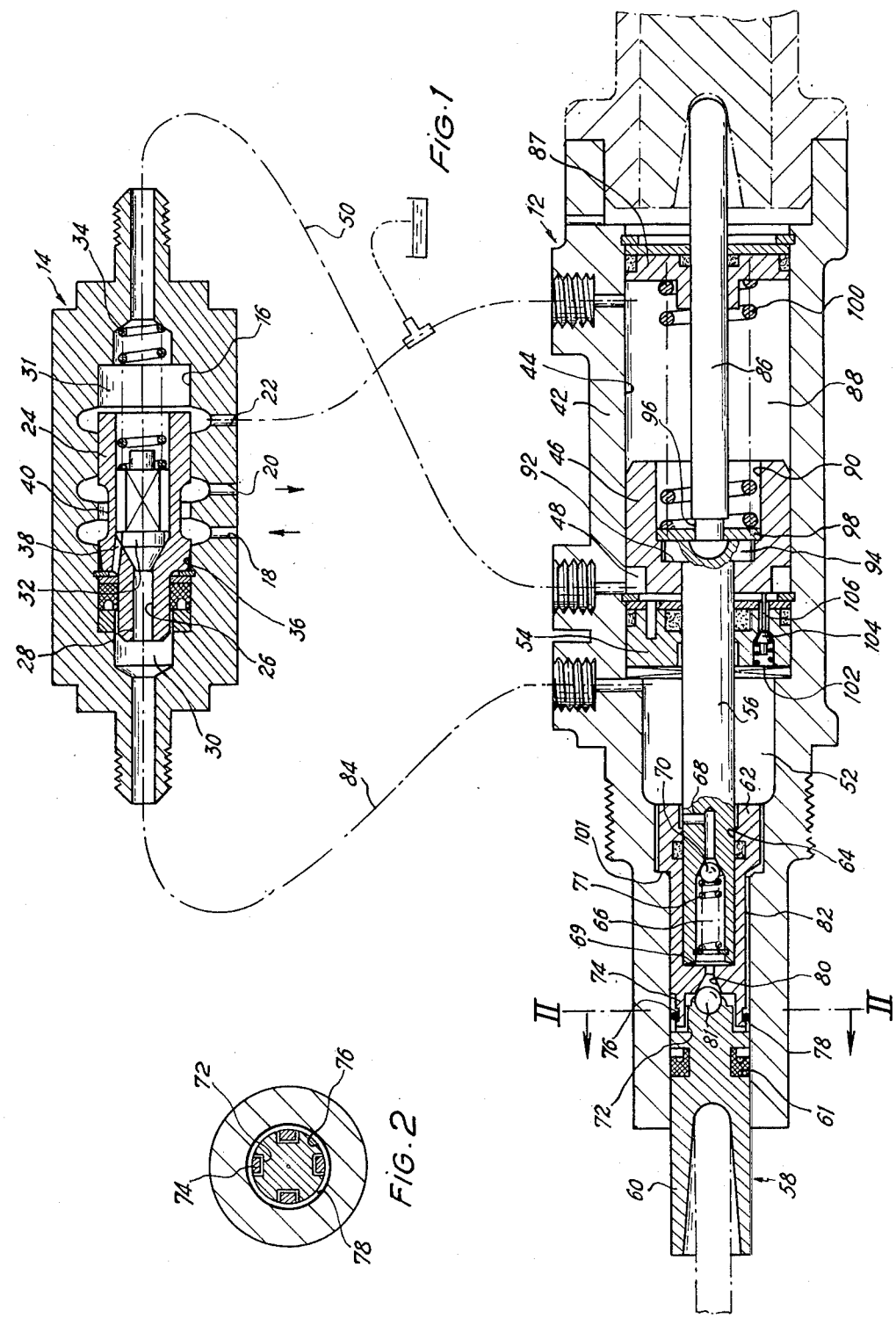

POWER BOOST MECHANISM

The present invention relates to a power boost mechanism for use in the brake system of an automotive vehicle. More specifically, the invention is an improvement to the device disclosed in our German patent application P 2125880.0 filed on May 25, 1971 to which corresponds U.S. patent application Ser. No. 250,397, now U.S. Pat. No. 3,831,491 filed on May 4, 1972.

It has already been proposed power boost mechanisms comprising housing means defining a working chamber and a control chamber therewithin, said control chamber being filled with incompressible fluid, a valve member responsive to the fluid pressure level in said control chamber to shift from a released position venting said working chamber to communicate successively high fluid pressure levels into said working chamber as said valve is shifted from said released position, a piston slidably mounted in said working chamber, said fluid pressure level in said control chamber varying as a function of the displacement in said control chamber of at least one input plunger and of an output plunger moving as a whole with said piston, said input plunger being operatively disposed in said control chamber to cooperate with said output plunger in case of failure of said control pressure for permitting the manual actuation of said output piston.

By an adequate selection of the effective areas of the plungers the manufacturers may obtain an input plunger/output piston stroke ratio less than unity. In such a case when the power boost mechanism operates under "power-on" condition, the travel of the output plunger is longer than the travel of the input plunger. However, in case of power failure there is a lost motion before the plungers engage one with the other. This lost motion can give to the operator the undesirable feeling that the brakes have failed.

With a view to avoiding this drawback, the invention proposes a power boost mechanism comprising housing means defining a working chamber and a control chamber therewithin, said control chamber being filled with incompressible fluid, a valve member responsive to the fluid pressure level in said control chamber to shift from a released position venting said working chamber to communicate successively higher fluid pressure levels into said working chamber as said valve is shifted from said released position, a piston slidably mounted in said working chamber, said fluid pressure level in said control chamber varying as a function of the displacement in said control chamber of at least one input plunger and of an output plunger moving as a whole with said piston, said input plunger being operatively disposed in said control chamber to cooperate with said output plunger in case of failure of said working pressure for permitting the manual actuation of said output piston, the input plunger/output plunger effective area ratio in said control chamber being more than unity, a relief valve responsive to the differential of pressures existing in said control chamber and said working chamber and adapted to allow fluid to escape from said control chamber when said differential of pressure reaches a predetermined value, said plungers projecting one into the other to define therebetween a cavity communicating with said control chamber on one hand through a one-way valve permitting fluid to flow from said control chamber into said cavity, on the other hand by an exhaust passage closed when said input plunger is biased towards said output plunger.

The invention will now be described by way of example with reference to the accompanying drawings wherein:

FIG. 1 is a diagrammatic view of a power boost mechanism embodying the invention, FIG. 2 is a cross-sectional view along line II—II of the power boost mechanism illustrated in FIG. 2, and FIG. 3 is a partial view of another embodiment of the invention.

As illustrated in FIG. 1, the power boost mechanism adapted to be included in a vehicle brake system essentially comprises a servomotor unit 12 and a control valve unit 14. The control valve unit of open center type is provided with an inlet port 18 connected to a source of pressurized fluid (not shown), an outlet port 20 connected to a hydraulic receiver such as a power steering device (not shown) and a return port 22 connected to a fluid reservoir (not shown). The ports 18, 20, 22 open into a bore 16 in which is slidably mounted a spool valve 24. The spool valve is provided with an axial duct 26 in which is located a relief valve 32. When viewing FIG. 1, the spool valve comprises a smaller portion defining a control piston member 28 which sealingly engages the smaller end of bore 16 to define in the latter two compartments 30 and 31. The larger portion of the spool valve 24 is provided with a groove 40 allowing fluid to freely flow from inlet port 18 to outlet port 20, and with a chamber 36 and a passage 38. A spring 34 biases the spool 24 and the relief valve 32 into their rest position as illustrated in FIG. 1. In this position, compartment 31 communicates with return port 22 and substantially all the fluid flowing into inlet port 18 is directed to outlet port 20. When the spool valve 24 is biased towards the right of the figure, the communication between compartment 31 and return port 22 is closed and the flow of fluid between ports 18 and 20 is restricted. However, an amount of fluid flowing into port 18 is directed into compartment 31 along chamber 36 and passage 38.

The output servomotor unit 12 comprises a housing 42 with a bore 44 in which a working piston 46 is sealingly received to define a working chamber 48. The working chamber communicates with compartment 31 of the control valve by way of a line 50. A control chamber 52 is provided in bore 44 and is separated from working chamber 48 by a wall 54. An output plunger 56 connected to said working piston 46 sealingly extends through the wall 54 and projects into said control chamber 52. The output plunger 56 is aligned with an input plunger 58 which also projects into the control chamber 52. The input plunger 58 comprises a rod portion 60 sealingly cooperative with the servomotor housing by the intermediary of seal ring 61, and a head portion 62. The rod portion 60 is suitably connected to the usual brake pedal of the vehicle (not shown). The head portion 60 is provided with a stepped bore 64 sealingly receiving the end of the output plunger 56 to define therewith a fluid cavity 66. The cavity 66 communicates with the control chamber 52 through a channel 68 in plunger 56, said channel being controlled by a one-way valve 70 permitting fluid to flow from chamber 52 to the cavity 66. The rod portion 60 and the head portion 62 of the input plungers are linked by a double-abutting connection having a small axial clearance. As illustrated in detail in FIGS. 1 and 2, the inner end of the rod portion 60 is provided with four grooves 72 in which are received four corresponding tongues 74 projecting from the head portion 62. The outer wall of the tongues 74 and of the inner end of rod portion 60 is provided with a groove 76 in which is mounted with axial play a resilient ring 78. The head portion 62 is provided with an exhaust passage 80 opening in front of the rod portion in which is secured a valve ball 81 adapted to sealingly close the passage 80 when the rod portion 60 and the head portion 62 are in a retracted abutting cooperation. When the exhaust passage 80 is opened fluid is allowed to flow from cavity 66 to control chamber 52 along the axial spline 82 provided on the outer wall of head portion 62. Finally, the control chamber 52 is connected to compartment 30 of the control valve by a line 84.

The working piston 46 is connected to a brake master-cylinder (partially shown in dotted line) by a push rod 86 extending through a seal plug 87. The seal plug 87 defines with said piston a low pressure compartment 88 communicating with the fluid reservoir (not shown) and port 22 of the control valve. The working piston 46 is provided with a bore 90 opening into compartment 88. The bottom of the bore 90 has a recess 92 receiving the expanded head 94 of the plunger 56. The head 94 receives the end of push rod 86 in which is machined a groove 96 adapted to cooperate with a spacer 98 having a U-cut. A return spring 100 urges the piston 46 and the output plunger 56 by the intermediary of the spacer 98 towards their rest positions such as illustrated in FIG. 1. It should be noted that in such a case the output plunger engages the bottom 69 of the bore 64 while the shoulder 101 of the head portion 62 engages the servomotor housing. The control chamber 52 communicates with working chamber 48 by a refill passage 102 having a spring-loaded refill valve 104. As illustrated in FIG. 1, when the working piston is in it rest position, it engages a projection 106 of the refill valve 104 to maintain the latter in its open position. Complementary details of the structure of power boost mechanism are given in the above referenced U.S. patent application Ser. No. 250,397.

The power boost mechanism shown in FIG. 1 operates as follows:

Assuming that the input plunger 58 and the spool valve 24 are into their rest positions, the control chamber 52 communicates with the working chamber 48 through refill passage 102 and said working chamber 48 communicates through compartment 31 and the return port 22 with the low pressure fluid reservoir.

Assuming that the power boost mechanism operates normally with the power assistance of the source of pressurized fluid ("power-on" condition), the rod portion 60 of the input plunger 58 is shifted to the right of FIG. 1 when the usual brake pedal of the vehicle is depressed. Approximately 1 mm of movement serves to close the exhaust passage 80 and the refill passage 102. Further movement of the input plunger 58 expels fluid from chamber 52. Since at this point the pressure in the control chamber 52 is very low, the fluid does not flow into compartment 30. Eventually, some resistance is encountered due to actuation of the brake master cylinder and appreciable pressure must be developed in the control chamber 52 so that the braking action can be carried out. The control pressure is transmitted to the spool valve 24 through line 84. When the control pressure exceeds, for example, 3 Kg/cm2, the resistance afforded to the spool valve 24 by the return spring is overcome and the spool valve 24 shifts to the right. Therefrom results a pressure build-up in compartment 31 and in the working chamber 48, thereby boosting the actuation of the brake master-cylinder. Details of the operation of the power boost mechanism are given in the before referenced U.S. patent application.

According to the above, during a "power-on" braking, the end of the plunger 56 slides in the bore 64 thereby increasing the volume of cavity 66. There appears a suction phenomenon in the cavity 66, which improves the fluid-tight cooperation between the valve 81 and the head portion 62. Due to the fact that the spring 71 is lightly loaded, the ball 70 is unseated to allow fluid to flow from the chamber 52 into the cavity 66, the fluid pressures in the chamber 52 and the cavity 66 being substantially equal.

The cross-sectional area of the input plunger 58 is twice that of the output plunger 56. Since substantially uninhibited fluid communication is permitted from chamber 52 into cavity 66, since the fluid used in the booster is incompressible, and since no compensating fluid is available for communication into chamber 52 after the valve 104 is closed, the sum of the volumes of chamber 52 and cavity 66 must be constant during actuation of the booster. Since the plunger 56 moves with piston 46, it shifts to the right viewing FIG. 1 as piston 46 shifts. Consequently, in order to maintain the sum of the volumes of chamber 52 and cavity 66 constant, input plunger 58 must also move to the left. But since the crosssectional area of plunger 58 is twice that of plunger 56, plunger 58 must move only one-half the distance that plunger 56 moves in order to displace an equal volume of the chamber 52 and cavity 66.

Upon releases of the brake pedal, the input plunger 58 and the output plunger 56 move to the left of FIG. 1 as a whole until the head portion 62 abuts the servomotor housing. Then, the force of the return spring 100 transmitted to the fluid trapped in the cavity 66 acts on valve ball 81 to open the exhaust passage 80, thereby permitting the various components of the power boost mechanisms to return to their rest positions.

Assuming now that a power failure occurs during a "power-on" braking phase (the input and output plungers being disengaged). The driver of the vehicle instinctively increases the force applied to the brake pedal. This force is transmitted to the output plunger 56 by the fluid trapped in cavity 66, but also causes the pressure in the control chamber 52 to incrase for example to 4 Kg/cm2, whereupon the relief valve 32 is forced off its seat. Fluid from chamber 52 flows into compartment 31 permitting the input and output plungers to be moved as a whole. When the brake pedal is released the escaped fluid is allowed to flow back in the control chamber by the refill passage 102.

It should be pointed out that thanks to the invention, the pedal ratio change, as described in U.S. application 250,397, now U.S. Pat. No. 3,831,491 appears substantially simultaneously with the change from "power-on" condition to "power-off" condition without any substantial lost motion of the input plunger 58.

Another embodiment of the invention is partially illustrated in FIG. 3 which shows a view of the left hand part of the servomotor unit 212. The components of this later embodiment which are substantially the same as those of the first embodiment, illustrated in FIGS. 1 and 2, are designated by the same reference numerals plus 200 and will not be described in details. Furthermore, the right hand part of the servomotor unit 212 and the control valve identical to the corresponding components of the first embodiment are not shown and not described again.

As illustrated in FIG. 3, a one-piece input plunger 258 is provided with a bore 264 sealingly receiving the end of the output plunger 256 to define therewith a cavity 266. The cavity 266 communicates with the chamber 252 by an exhaust passage 280, controlled by a valve arrangement 150. The valve arrangement 150 comprises a one-way refill valve, the valve member 270 of which being biased by a spring 271 abutting a cup member 152 secured to the input plunger 258, and a slidable member 154 adapted to unseat the valve member 270 when the input plunger 258 is in its rest position. The slidable member 154 located in said input plunger 258 presents one end projecting into a diametral split 156 provided in plunger 258 to engage a stop pin 158 fixed to the servomotor housing and received in the split 156.

As illustrated in FIG. 3, the components of the power boost mechanism are in their rest position, the exhaust passage 280 being opened. Upon rightwards movement of plunger 258, the member 154 disengages the pin 158. The spring 171 urges the valve member 270 against its seat. Then the valve member 270 and the spring 271 act as the one-way refill valve described in the first embodiment of the invention.

I claim:

1. A power boost mechanism comprising housing means defining a working chamber and a control chamber therewithin, said control chamber being filled with incompressible fluid, a valve member responsive to the fluid pressure level in said control chamber to shift from a released position venting said working chamber to communicate successively higher fluid pressure levels into said working chamber as said valve is shifted from said released position, a piston slidably mounted in said working chamber, said fluid pressure level in said control chamber varying as a function of the displacement in said control chamber of at least one input plunger and of an output plunger moving as a whole with said piston, said input plunger being operatively disposed in said control chamber to cooperate with said output plunger in case of failure of said control pressure for permitting the manual actuation of said output piston, the input plunger/output plunger effective area ratio in said control chamber being more than unity, a relief valve responsive to the differential of pressures existing in said control chamber and said working chamber and adapted to allow fluid to escape from said control chamber when said differential of pressure reaches a predetermined value, one of said plungers projecting into the other plunger to define a cavity between said plungers communicating with said control chamber, a one-way valve permitting fluid to flow from said control chamber into said cavity, an exhaust passage also communicating the cavity with the control chamber, and means for closing said exhasut passage when said input plunger is urged towards said output plunger.

2. A power boost mechanism according to Claim 1, wherein said input plunger comprises a rod portion having one end sealingly projecting into said control chamber and a head portion located in said control chamber and slidably secured to said rod portion by a connection having an axial clearance to define a portion of said exhaust passage, said head portion being provided with a bore receiving said output plunger to define therewith said cavity.

3. A power boost mechanism according to claim 2, wherein said head portion engages said housing means when the input plunger is in its rest position.

4. A power boost mechanism according to claim 1, and a refill valve permitting fluid to flow back into said control chamber during the return stroke of said input plunger.

* * * * *